(12) United States Patent
Slothouber et al.

(10) Patent No.: US 8,732,746 B2
(45) Date of Patent: May 20, 2014

(54) SYSTEM FOR AND METHOD OF TARGETING BROADCAST MESSAGES

(75) Inventors: Louis P. Slothouber, Leesburg, VA (US); Jeffrey W. Johnston, Charlottesville, VA (US)

(73) Assignee: Fourthwall Media, Inc., Dulles, VA (US)

( * ) Notice: Subject to any disclaimer, the term of this patent is extended or adjusted under 35 U.S.C. 154(b) by 339 days.

(21) Appl. No.: 12/763,782

(22) Filed: Apr. 20, 2010

(65) Prior Publication Data

US 2010/0306812 A1 Dec. 2, 2010

Related U.S. Application Data

(60) Provisional application No. 61/213,354, filed on Jun. 1, 2009.

(51) Int. Cl.
   *H04N 7/10* (2006.01)
(52) U.S. Cl.
   USPC .............................................. 725/34; 725/35
(58) Field of Classification Search
   USPC .............................................. 725/34, 35, 32
   See application file for complete search history.

(56) References Cited

U.S. PATENT DOCUMENTS

| | | | |
|---|---|---|---|
| 6,249,320 B1 * | 6/2001 | Schneidewend et al. | 348/569 |
| 6,463,533 B1 * | 10/2002 | Calamera et al. | 713/163 |
| 6,718,551 B1 | 4/2004 | Swix et al. | |
| 7,065,579 B2 * | 6/2006 | Traversat et al. | 709/230 |
| 7,120,921 B1 * | 10/2006 | Ito | 725/32 |
| 7,206,934 B2 * | 4/2007 | Pabla et al. | 713/168 |
| 7,657,597 B2 * | 2/2010 | Arora et al. | 709/206 |
| 7,669,056 B2 * | 2/2010 | Frank et al. | 713/176 |
| 8,032,529 B2 * | 10/2011 | Gupta et al. | 707/736 |
| 2002/0078444 A1 * | 6/2002 | Krewin et al. | 725/35 |
| 2006/0028323 A1 * | 2/2006 | Ohno et al. | 340/425.5 |
| 2006/0046649 A1 | 3/2006 | Videtich | |
| 2008/0263674 A1 | 10/2008 | Yao | |
| 2009/0067551 A1 | 3/2009 | Chen et al. | |
| 2009/0070159 A1 | 3/2009 | Ahvenainen et al. | |
| 2009/0133077 A1 * | 5/2009 | Smith | 725/75 |

FOREIGN PATENT DOCUMENTS

| | | |
|---|---|---|
| EP | 1113600 A2 | 7/2001 |
| JP | 2001-127719 A | 5/2001 |
| JP | 2008-271081 A | 11/2008 |

OTHER PUBLICATIONS

PCT International Search Report and PCT Written Opinion of the International Searching Authority; mailed Jul. 27, 2010; for International Application No. PCT/US2010/036872; 7 pages.
Office Action from corresponding Japanese Application No. 2012-513358 mailed Dec. 5, 2013.
English Translation of Office Action from corresponding Japanese Application No. 2012-513358 mailed Dec. 5, 2013.

* cited by examiner

*Primary Examiner* — James R Sheleheda
(74) *Attorney, Agent, or Firm* — Hunton & Williams LLP

(57) ABSTRACT

A system for and method of targeting a broadcast message to a subset of potential electronic receivers in a broadcast network is presented. The system and method may comprise collecting identifying information associated with designated electronic receivers of a targeted broadcast message, generating, using a computer processor, a data set structure using the identifying information, associating the data set structure with the targeted broadcast message, and broadcasting the targeted broadcast message and the data set structure to a plurality of electronic receivers, wherein the data set structure provides information allowing at least one of the plurality of electronic receivers to determine whether the targeted broadcast message is targeted to the at least one electronic receiver.

28 Claims, 8 Drawing Sheets

| Receiver ID Information | True bit for h1(x) | ... | True bit for hj(x) | ... | True bit for hk(x) |
|---|---|---|---|---|---|
| x1 | b11 | ... | b1j | ... | b1k |
| x2 | b21 | ... | b2j | ... | b2k |
| x3 | b31 | ... | b3j | ... | b3k |
| ... | ... | ... | ... | ... | ... |
| xi | bi1 | ... | bij | ... | bik |
| ... | ... | ... | ... | ... | ... |
| xn | bn1 | ... | bnj | ... | bnk |

Figure 7

SYSTEM FOR AND METHOD OF TARGETING BROADCAST MESSAGES

CROSS-REFERENCE TO RELATED APPLICATIONS

The present application claims priority to U.S. Provisional Patent Application No. 61/213,354 filed Jun. 1, 2009 entitled "Method for Targeting Broadcast Messages Using Embedded Sets," the disclosure of which is hereby incorporated by reference in its entirety.

BACKGROUND INFORMATION

In various networking contexts, it is often necessary to send messages from one node to a designated subset of other connected nodes. Two methods of messaging commonly used are point-to-point (a.k.a. unicast) and broadcast.

Point-to-point messaging assumes every node is addressable via a unique identifier and the sender node addresses and sends a copy of a message to each designated receiver node. It is the most common method of delivering messages in Internet Protocol (IP) networks. Point-to-point messaging is expensive in terms of resources when the number of designated receivers is large since a given message may be duplicated and sent over many different paths.

Broadcast messaging involves sending a single message simultaneously to all receivers. Examples are over-the-air (broadcast) television and cable and satellite content delivery. In broadcast messaging, there is not a built-in mechanism for limiting a message to a subset of designated receivers.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 7 is a table depicting a data set for targeting broadcast messages according to a particular embodiment.

DETAILED DESCRIPTION OF PREFERRED EMBODIMENTS

Disclosed herein are certain embodiments of a system and method for targeting a broadcast message to a specific subset of possible receivers in a broadcast network. A sender may embed into a message a set data structure constructed from the identifying information associated with desired receivers of the message. Such identifying information may uniquely identify a receiver using, for example, an IP address or MAC address. Identifying information may identify a group of receivers, as with a zip code, street name, or advertising segment code. The identifying information may be known by both sender and receiver. The message may be broadcast to the receivers, each of which may perform a set membership operation to determine whether or not their respective identifying information data is represented in the embedded set. If identifying information for a particular receiver is not represented in the set, the message may be ignored by that particular receiver. This method may provide an ability to send a message to a subset of receivers on a broadcast network using only simple broadcast messaging (e.g., UDP/IP) and may require no prior communication between sender and receivers. This may conserve bandwidth. Effectiveness of this method may be improved using a compact set representation for arbitrary types of receiver identifying information as well as a fast and simple method for set membership testing on receivers.

Bloom filters represent one example of a compact set representation with a fast and simple set membership test based on simple hashing, but at the cost of a small number of false positive set membership errors. This error rate can be reduced by increasing the size of the set representation. For example, to target n receivers a Bloom filter of size 10*n bits would produce a false positive error rate of just under 1%. (There are no false negatives.) In many applications, such as targeted advertising, small false positive error rates may be acceptable.

Figure 1:
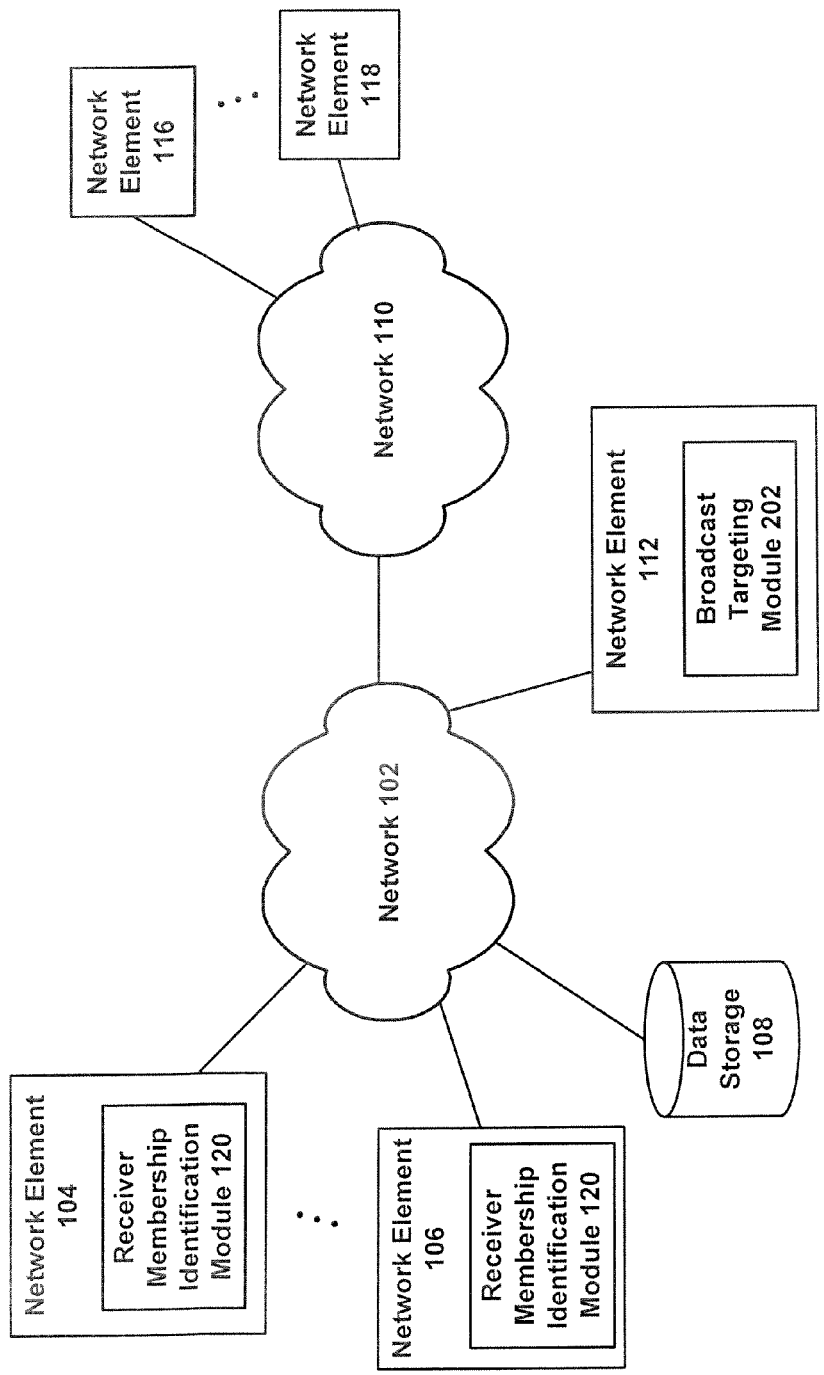
FIG. 1 is a schematic diagram illustrating a system for targeting broadcast messages according to a particular embodiment.

FIG. 1 is a schematic diagram illustrating a system for targeting broadcast messages according to a particular embodiment. As illustrated, network 102 may be communicatively coupled with one or more devices including network element 104, network element 106, data storage 108, and network element 112. Network elements 104 and 106 may contain receiver membership identification modules 120. Network element 112 may contain broadcast targeting modules 202. Network 110 may be communicatively coupled to network 102, network element 116, and network element 118. Other devices may be communicatively coupled with networks 102 and 110 via one or more intermediary devices.

The description below describes network elements, computers, and components of a system of and method for targeting broadcast messages that may include one or more modules. As used herein, the term "module" may be understood to refer to computing software, firmware, hardware, and various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Networks 102 and 110 may be one or more of a wireless network, a wired network or any combination of wireless network and wired network. According to one or more embodiments, network 102 may be a broadcast service provider's network (e.g., a cable network). Network 110 may be an external network (e.g., the Internet). Networks 102 and 110 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, networks 102 and 110 may include, without limitation, telephone line, fiber optics, IEEE Ethernet 802.3, a Wide Area Network ("WAN"), a Local Area Network ("LAN"), or a global network such as the Internet. Also, networks 102 and 110 may support, a Internet network, a wireless communication network, a cellular network, or the like, or any combination thereof. Networks 102 and 110 may further include one, or any number of the exemplary types of networks mentioned above operating as a stand-alone network or in cooperation with each other. Networks 102 and 110 may utilize one or more protocols of one or more network elements to which it is communicatively coupled. Networks 102 and 110 may translate to or from other protocols to one or more protocols of network devices. Although networks 102 and 110 are each depicted as a single network, it should be appreciated that according to one or more embodiments, network 102 and network 110 may each comprise a plurality of interconnected networks, such as, for example, a service provider network, the Internet, a broadcaster's network, a cable television network, corporate networks, and home networks.

Network elements 104, 106, 112, 116, 118, and data storage 108 may transmit and receive data to and from networks 102 and 110 such as, for example, broadcast television data, videoconferencing data, multimedia data, and other data. The data may be transmitted and received utilizing a standard telecommunications protocol or a standard networking protocol. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Networks 102 and 110 may use standard wireless protocols including IEEE 802.11a, 802.11b and 802.11g. Networks 102 and 110 may also use protocols for a wired connection, such as an IEEE Ethernet 802.3.

Network elements 104, 106, 112, 116, 118, and data storage 108 may include one or more processors for recording, transmitting, receiving, and storing data. Although network elements and data storage 108 are depicted as individual elements, it should be appreciated that the contents of one or more of a network element and data storage 108 may be combined into fewer or greater numbers of devices and may be connected to additional devices not depicted in FIG. 1. Furthermore, the one or more devices may be local, remote, or a combination thereof to a first network element and data storage 108.

According to some embodiments, network elements 104 and 106 may be electronic receivers (e.g., a set-top box; a device, configured to receive broadcast data, integrated with a TV; or a mobile device capable of receiving broadcast data). Network elements 104 and 106 may be capable of receiving targeted broadcast messages.

Receiver membership identification module 120 may receive the targeted broadcast message, compare the data set structure against identifying information associated with the electronic receiver and perform an action associated with the electronic receiver in the event that the identifying information associated with the electronic receiver matches identifying information in the data set structure. According to some embodiments, receiver membership identification module 120 may use a same algorithm as a sending network element (e.g., set data generation module 204 of the broadcast targeting modules 202 of network element 112) to determine whether a receiver or network element is targeted by a targeted broadcast message.

Network element 112 may be a server or device or combination of devices at a centralized location (e.g., a cable broadcast network headend location). Network element 112 may provide one or more services for targeting broadcast messages.

Data storage 108 may be network accessible storage and may be local, remote, or a combination thereof to network elements 104 and 106. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

According to some embodiments, data storage 108 may be a relational database that may store targeted message data, receiver identification data, hash algorithm data, market segmentation data, and other data for targeting broadcast messages. Data may be aggregated, sorted, processed, and queried to identify receivers for a broadcast message, receiver identification data, hash algorithm data, or other information.

The various components of system 100 as shown in FIG. 1 may be further duplicated, combined and/or integrated to support various applications and platforms. Additional elements may also be implemented in the systems described above to support various applications.

In the addressable advertising space, it may be useful to target a particular advertisement to a select group of customers. Such advertising can take various forms. In some cases, the advertisement or advertisement enhancement (e.g., an interactive application overlaying a 30 second video commercial) may be displayed only to a subset of recipients. Customers who are not targeted may not see the ad and/or ad enhancement. In other cases, the advertisement shown to each customer may be selected from a set of available advertisements, with different subsets of receivers presenting different advertisements.

A method according to an embodiment described herein, which may be implemented on the system of FIG. 1 or on other systems, provides a way for messages sent via broadcasting means to be targeted to a subset of receivers using embedded sets. The method may include one or more of: the sender collecting identifying information associated with designated receivers of a particular message; the sender generating a set data structure from the receiver identifying information; the sender embedding the set data structure in the message; and the sender broadcasting the resulting message to multiple receivers. Each of the multiple receivers may then test its respective identifying information to see if it is a member of the set data structure embedded within the received message; and each receiver may generates distinct behavior based on the outcome of the set membership test.

For this method, the identifying (ID) information stored on the receiver may be data previously known to the receiver, not special codes transmitted and managed via proprietary sender and receiver targeting transactions.

One possible set data structure is a Bloom filter. A Bloom filter may be generated by hashing each piece of receiver ID information to a bit address within fixed-size bit vector, and setting the bit at that address to True (e.g., "1"). This may be repeated several times (e.g., 5 to 10), using a distinct hashing function each time. Making a message targeting decision on a receiver may then correspond to testing the receiver's own ID information for membership in the set defined by the embedded Bloom filter (i.e., bit vector). The same hashing functions used to generate the Bloom filter may then be applied to the receiver's ID information, and if all bits thus addressed are found to be True (e.g., "1"), then the set membership test may return True. If any of the bits thus addressed are found to be False (e.g., "0") the set membership test may return False. If this set membership test returns True, an application-specific action may be taken (e.g., the message is processed). Otherwise, a different action may be taken (e.g., the message is ignored).

In addition to bandwidth, memory, and processing advantages of this method, a Bloom filter provides privacy benefits given the receiver ID information is encrypted, making it difficult for third parties to discern the identities of receivers being targeted.

According to some embodiments, as discussed in greater detail in reference to FIG. 2 below, set data generation module 204 may collect identifying information associated with designated electronic receivers of a targeted broadcast message and generate a data set structure using the identifying information. The message may then be associated with the data set structure with the targeted broadcast message (e.g., embedded) and broadcasted with the data set structure to a plurality of electronic receivers (e.g., network elements 104 and 106). The data set structure may provide information allowing an electronic receiver to determine whether the targeted broadcast message is targeted to the electronic receiver.

Figure 2:
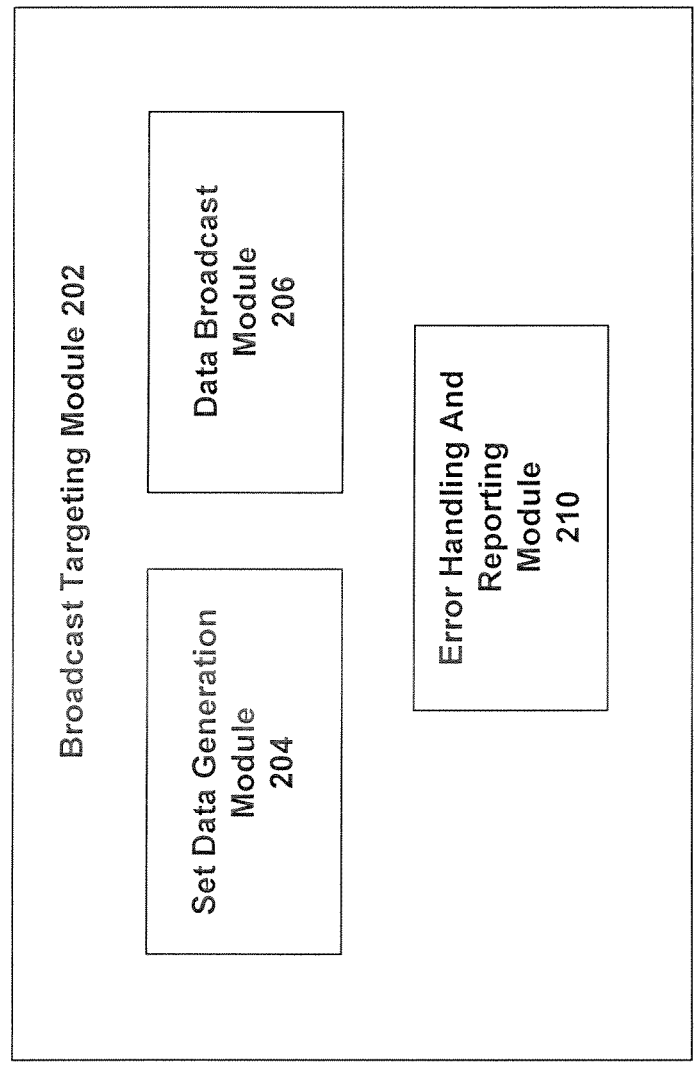
FIG. 2 is a block diagram of a module for targeting broadcast messages according to a particular embodiment.

FIG. 2 is a block diagram of a module for targeting broadcast messages according to a particular embodiment. As illustrated, the broadcast targeting module 202 may contain one or more components including set data generation module 204, data broadcast module 206, and error handling and reporting module 210. Although broadcast targeting module 202 is depicted as a single module, functionality or modules of broadcast targeting module 202 may be located on a single device or distributed across a plurality of devices including one or more centralized servers and one or more pieces of customer premises equipment or end user devices.

Set data generation module 204 may collect identifying information associated with designated electronic receivers of a targeted broadcast message and generate a data set structure using the identifying information. The message may then be associated with the data set structure with the targeted broadcast message (e.g., embedded) and broadcasted with the data set structure to a plurality of electronic receivers (e.g., network elements 104 and 106). The data set structure may provide information allowing an electronic receiver to determine whether the targeted broadcast message is targeted to the electronic receiver. Identifying information used to form a data set structure may include information uniquely identifying a designated electronic receiver such as, for example, a Media Access Control (MAC) address, a street address, a customer identifier, and a network address. Identifying information used to form a data set structure may also include information identifying a collection of designated electronic receivers such as, for example, a zip code, a city name, a Nielsen™ Claritas PRIZM code, a demographic profile identifier, a segment identifier, and a group identifier. The data set structure may be structured in one or more formats, for example, a data set structure may be a compressed list of receiver information or a collection of distinct multi-bit hashes generated using a single hash algorithm. According to some embodiments, a data set structure may be a Bloom filter.

A Bloom filter may be generated by an operation using a hashing algorithm to generate a hash code of identifying information associated with designated electronic receivers of a targeted broadcast message to a bit address within a fixed-size hit vector and setting a bit corresponding to the bit address to true. The hashing operation and hit setting may be repeated one or more times using a different hashing algorithm each time. Generating a Bloom filter is discussed in greater detail in reference to FIG. 5 below.

Data broadcast module 206 may broadcast a targeted broadcast message over one or more of: a terrestrial broadcast TV network, a cable TV network, a satellite TV network, and other types of broadcast networks. According to some embodiments, data broadcast module 206 may broadcast a targeted broadcast message to all receivers or network elements on a broadcast network. As discussed in greater detail with respect to FIG. 6 below, a particular receiver or network element may determine whether a targeted broadcast message is targeted to that particular receiver or network element.

Error handling and reporting module 210 may handle one or more errors associated with targeting broadcast messages. Error handling and reporting module 210 may provide alerts or messages to administrators in the event of an error. Error handling and reporting module 210 may produce one or more reports including diagnostic test result reports. Error handling and reporting module 210 may produce log files and formatted reports.

Figure 3:
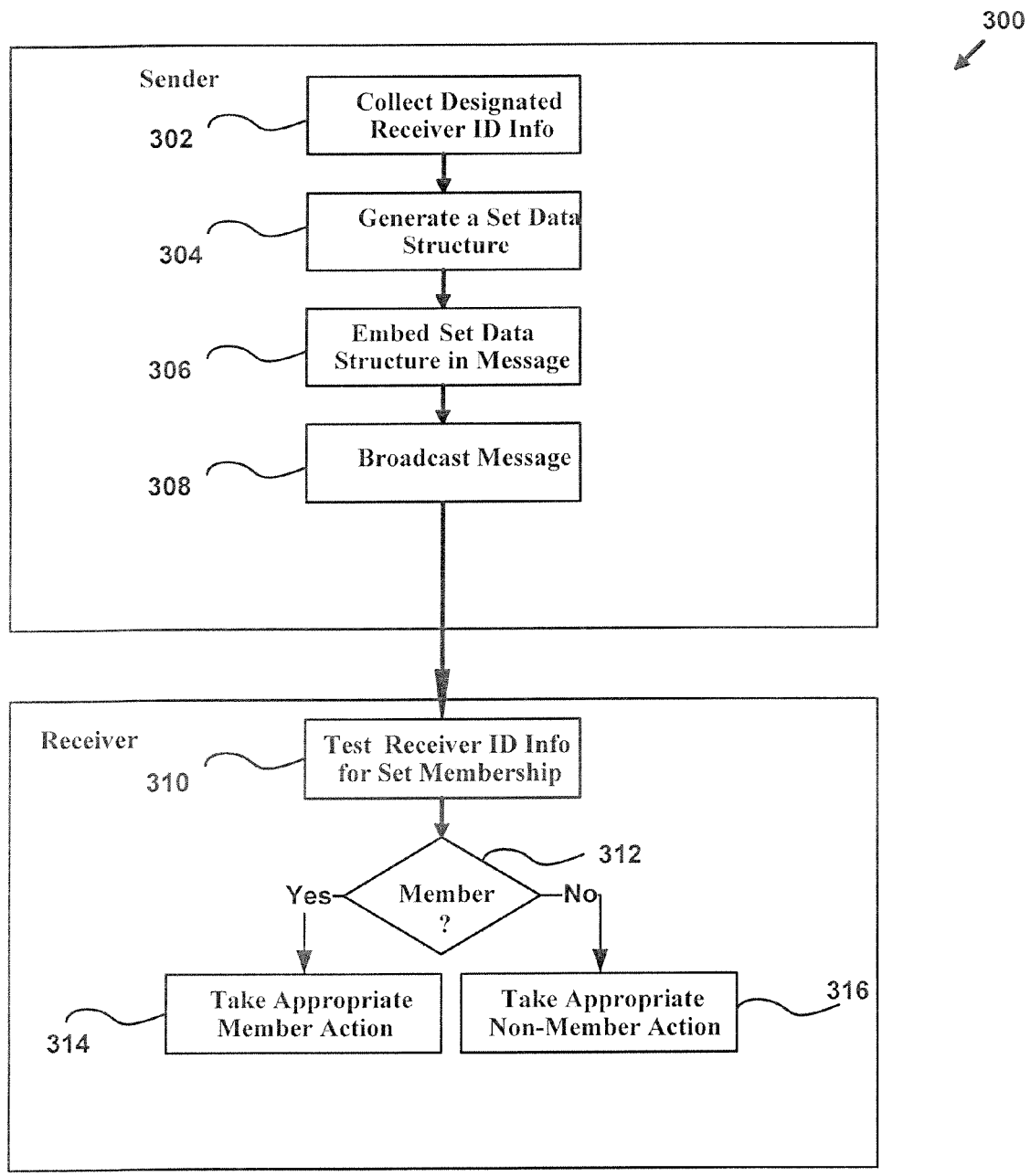
FIG. 3 is a flowchart illustrating transmitting and receiving targeting broadcast messages according to a particular embodiment.

FIG. 3 is a flowchart illustrating transmitting and receiving targeting broadcast messages according to a particular embodiment. At block 302, ID information associated with the designated receivers of a particular message may be collected. Such collection may be done by a sender node, but can alternatively be done by another node or agency associated with a network. Receiver ID information can consist of or include traditional addressing information, or it can be any other information suitable for distinguishing one receiver (or group of receivers) from another. For example, receiver ID information can consist of or include unique receiver addresses such as, for example, Media Access Control (MAC) addresses, street addresses, or customer identification data. Alternatively, it can consist of or include non-unique addresses such as, for example, zip codes, city names, Nielsen™ Claritas PRIZM, or other codes representing segments of receivers. Any identifying information that is readily available on receivers and suitable for selectively targeting messages may be utilized. Such receiver ID information may, for example, be collected by comparing an existing customer list provided by an advertiser with customer contact information in a cable operator's customer database and gathering the receiver ID info (e.g., MAC addresses) pertinent to the advertiser's customer list. Alternatively, for example, the ID info might consist of or include zip codes deemed pertinent to a particular message selected from a set of all valid zip codes. Similarly, more complex targeting decisions e.g., behavioral targeting) may be employed by the sender using whatever information about receivers is available, resulting in the collection of the selected receivers ID information.

At block 304, a set data structure may be generated from the receiver ID information. A set data structure may be an encoded form of receiver ID information that identifies receivers being targeted by the message. A method of encoding a set data structure using a Bloom filter is described in reference to FIG. 5 below. Some alternatives include: utilizing an uncompressed list of receiver ID information, utilizing a list of receiver ID information compressed using one or more compression techniques, and utilizing distinct multi-bit hashes generated using a single hash algorithm to represent each piece of receiver ID information. A set data structure may also encode multiple collections of receiver ID information as multiple sets if desired.

One possible set data structure as generated in the block 304 is a Bloom filter. A Bloom filter may utilize multiple different hashing algorithms to encode elements of a set into a bit vector wherein a single bit may be set for each element for each hashing algorithm. Bloom filters may provide a compact memory footprint, fast encoding and decoding, and encryption.

At block 306, the resulting set data structure may be associated with the message. According to some embodiments, the resulting data set structure may be embedded in the message. Such embedding may be done by including the data set structure in a header associated with the message known to both the sender and receivers. An indication of the type of set data structure(s) may also be included in a header to identify the kind(s) of receiver ID information used in the set and the associated encoding mechanism. For example, set data structures built using zip codes and a Bloom filter may be distinguished in the header from set data structures built using MAC addresses and a different encoding technique. In one or more embodiments using Bloom filters, for example, information about parameters such as the size of the bit vector, desired error rate, and hash algorithm characteristics (e.g., applicable cryptographic "salt" data or nonce data) may also be embedded in the message.

At block 308, the resulting message with the associated set data structure may be broadcast to multiple receivers.

At block 310, the set data structure may be extracted from the message and the appropriate ID information associated with the receiver may be tested (compared) against that set data for membership. Such a test may be done on each receiver wherein software running on the receiver is configured to use a specified locally-stored identification data to test against the set data structure using appropriate encoding and decoding mechanisms for the comparison (e.g., an indicator such as a bit in the message header may specify an encoding mechanism to use for comparison). For example, if the message header indicates the set data structure uses MAC addresses and the encoding mechanism is a Bloom filter, the receiver may generate multiple appropriate hashes of its MAC address and test those generated hashes against the set data structure, assuming it is a Bloom filter that encodes MAC addresses of designated receivers. If multiple collections of receiver ID information were encoded in the set data structure (as noted in block 304), such set information may be extracted for suitable testing against appropriate receiver ID information. The comparison of a set data structure with receiver data is discussed in further detail in reference to FIG. 4 below.

At block 312, a determination may be made as to whether a particular receiver is a member of the set indicated by the set data structure in the broadcast message. If a particular receiver is a member of the set indicated by the set data structure in the broadcast message (e.g., identifying information associated with the receiver matches identifying information in the set data structure), the method 300 may continue at block 314. If a particular receiver is not a member of the set indicated by the set data structure in the broadcast message (e.g., identifying information associated with the receiver does not match identifying information in the set data structure), the method 300 may continue at block 316.

At block 314, a receiver, which is a member of the set indicated by the set data structure may perform a specified action. For example, the message may be presented on that receiver.

At block 316, a receiver which is not a member of the set indicated by the set data structure may perform a specified action for a receiver which is not a member (e.g., ignore or suppress the targeted broadcast message). Alternative targeting actions might involve presenting one message instead of another.

Among other applications, this method may be used to deliver targeted ad messages (interactive or non-interactive) in broadcast, satellite, and cable television networks.

Figure 4:
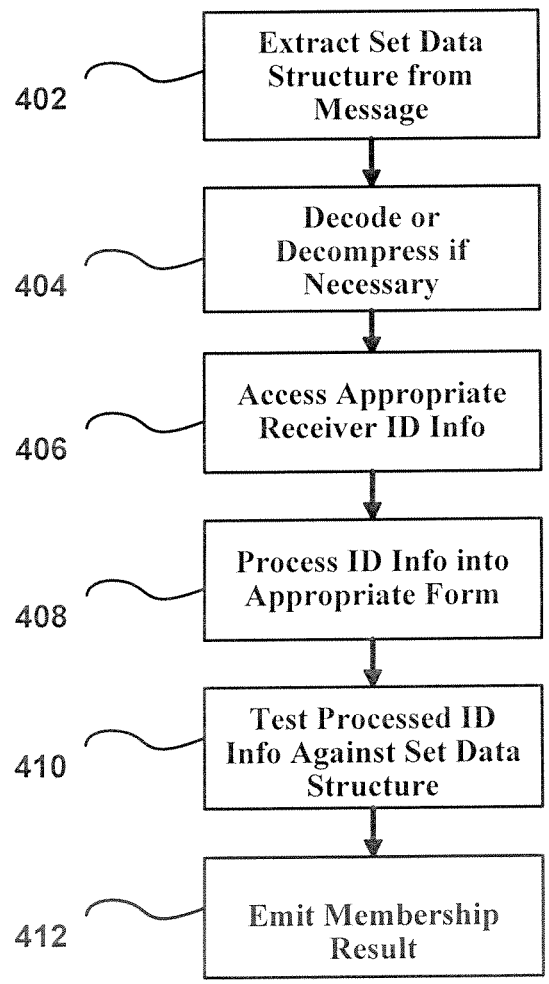
FIG. 4 is a flowchart illustrating testing receiver ID information for set membership according to a particular embodiment.

FIG. 4 is a detail flowchart of block 310 in FIG. 3 illustrating testing (comparing) receiver 1D information for set membership according to a particular embodiment. At block 402, the set data structure may be extracted from a broadcast message. The set data structure may be embedded, appended, or otherwise associated with a broadcast message. According to some embodiments, the set data structure may be embedded in a specified portion of the broadcast message header.

At block 404, a receiver of a targeted broadcast message may decode, decompress, or otherwise process the set data structure as necessary to extract receiver identification information. For example, a portion of broadcast message header data may be decompressed and a fixed size bit vector may be extracted.

At block 406, receiver identification information may be accessed. For example, a MAC address of the receiver may be obtained. Other receiver identification information may be used (e.g., a street address, a customer identifier, an account number, a network address, a zip code, a city name, a Nielsen Claritas PRIZM code, a demographic profile identifier, a segment identifier, and a group identifier).

At block 408, the receiver information may be processed into the appropriate form (e.g., using the same algorithm that the broadcaster uses to encode). According to some embodiments, the message may contain one or more of: an indicator of an algorithm to use, an indicator of receiver information to verify, and other target broadcast verification data. Processing of the receiver identification information may result a hash code, one or more bit addresses that should be set in a fixed size bit vector, or other processed receiver identification information.

At block 410, processed receiver identification information may be compared against the set data structure. According to some embodiments, bits in a fixed size bit vector may be compared. If all the bits which are set to true in the processed receiver identification information are set in the fixed size bit vector, then the receiver may be determined to be a member of the set indicated by the set data structure (e.g., the receiver may be a targeted receiver for the targeted broadcast message). If the processed receiver identification information contains hits that are not set in the fixed size bit vector, then the receiver may not be a member of the set indicated by the set data structure.

At block 412, a receiver may produce a result based on the determination of whether the broadcast message is targeted to the receiver. If the receiver is a member of the set indicated by the set data structure, the receiver may display the message. If the receiver is not a member of the set indicated by the set data structure, the receiver may ignore the message.

The processing, testing, and result emission steps of the set membership test process (i.e., blocks 408-412 of FIG. 4) may use the same hashing algorithms $h_j$ and receiver ID information $x_i$ (discussed in reference to FIG. 5 below) used to generate the set data structure in block 304 of FIG. 3 (where i here refers to the set data specific to the current receiver). Details for implementing these steps consistent with a Bloom filter are depicted in FIG. 5.

Figure 5:
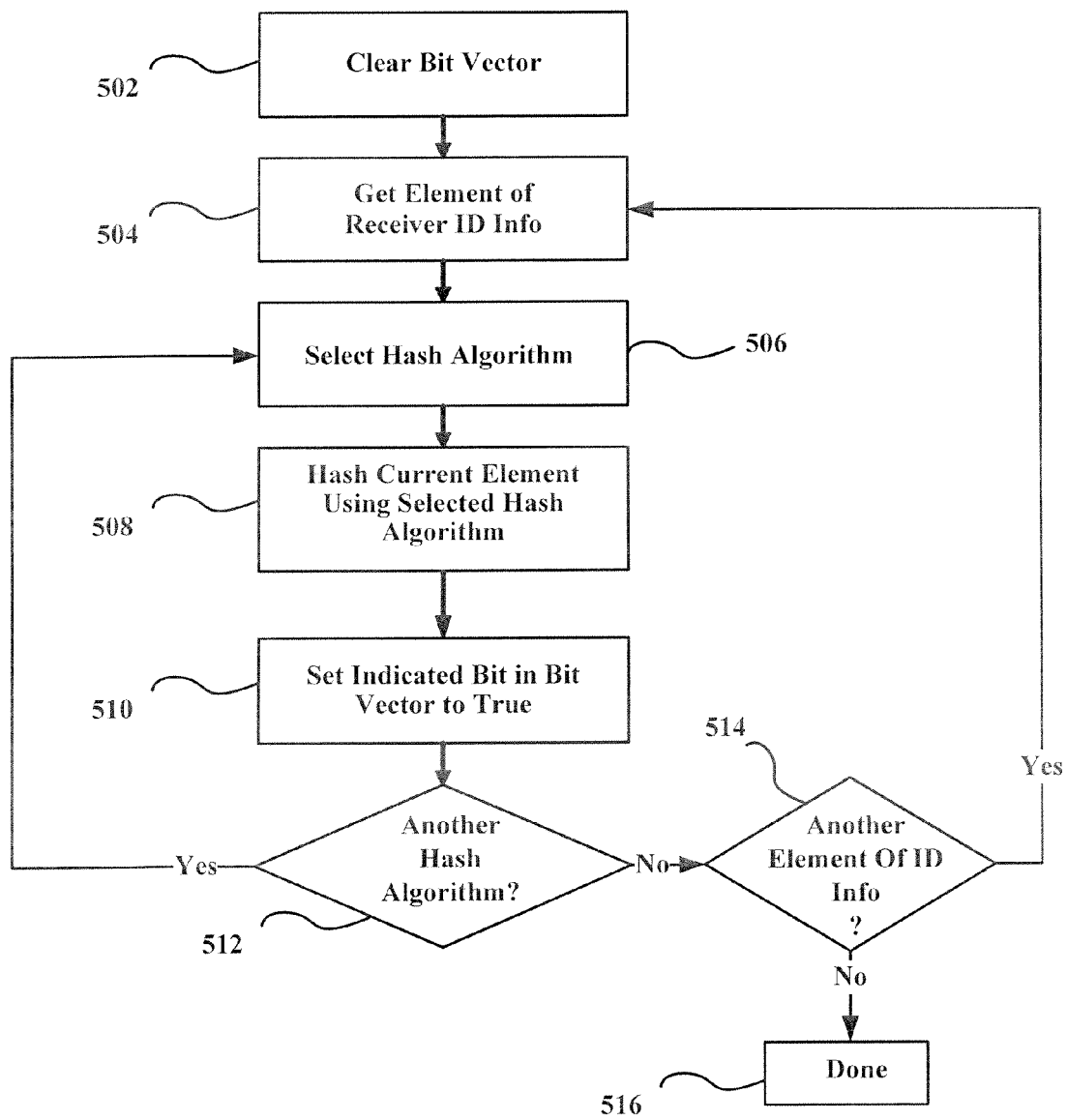
FIG. 5 is a flowchart illustrating generating a set data structure according to a particular embodiment.

FIG. 5 is a detail flowchart of block 304 of FIG. 3 illustrating generating a set data structure according to a particular embodiment. FIG. 5 depicts an algorithm for encoding receiver set data as a set data structure using a Bloom filter. By using high quality binary hashing algorithms and balancing be number of bits m in a bit vector with the number of receiver data elements to be hashed n and the number of independent hash algorithms to be used k, the probability of false positives $P_{err}$ can be minimized. For example, to assure a $P_{err} \approx 1\%$, set m=10*n and k=5. In general, $P_{err} \approx (1-e^{-kn/m})^k$.

At block 502, a bit vector of size m representing the set data structure is cleared (e.g., all bits set to FALSE or 0).

At block 504, the node generating the set data structure gets an element of receiver ID information $x_i$ from the collection of designated receiver ID info gathered in block 302 of FIG. 3 (where $_i$ represents a node number). Elements $x_i$ here refer, for example, to the unique or non-unique ID information specified previously, such as MAC addresses, street addresses, customer ID numbers, zip codes, city names, PRIZM codes, and the like.

In blocks 506-512, the current element may be processed once for each of multiple predefined hash algorithms $h_j$ wherein the element is hashed $h_j(x_i)$ to a single bit in the bit vector (j=1 to k). As indicated in block 506, the hash algorithm may be selected. Selection of a hash algorithm may depend on one or more rules or factors (e.g., a hash algorithm used may be determined by a number of targeted receivers and whether receivers are to be targeted directly or by group or segment). At block 508, the element of receiver identification information may be processed using the selected algorithm. At block 510, the indicated hash bit is set in the bit vector (e.g., =TRUE or 1). Note that if there are k hash algorithms, there will be up to k bits set in the bit vector as a result of execution of these four blocks.

At block 512, it may be determined whether the current receiver element is to be processed by another hash algorithm. If the current receiver element is to be processed by another hash algorithm (i.e., j<=k), the method may return to block 506. If the current receiver element is not to be processed by another hash algorithm (i.e., j>k), the method may continue at block 514.

At block 514, the collection of receiver ID information $x_i$ may be checked to see if another receiver element is to be encoded. If another receiver element is to be encoded, processing may return to block 504. If there are no more receiver elements in the collection, processing stops at block 516 and the resulting bit vector may be designated as the set data structure. (Each element in the collection is processed once.) This set data structure can be utilized by block 306 of FIG. 3 as is (e.g., as a string of 0 and 1 bits) or it can further processed to another form for embedding with a message. For example, if the bit vector contains many bits yet has few bits set (e.g., =1), a sparse or compressed encoding may be used for the filter string. In the sparse encoding case, rather than emit a string of 0 and 1 bits, a string of integers indicating only the set bits may be emitted. In the compressed case, one or more compression methods (e.g. Huffman, LZW) may be used to reduce the number of bits in the resulting filter string. If the number of bits included in the bit vector m was set to be as few as possible to achieve a target $P_{err}$, there may be minimal benefit to doing further compression.

Figure 6:
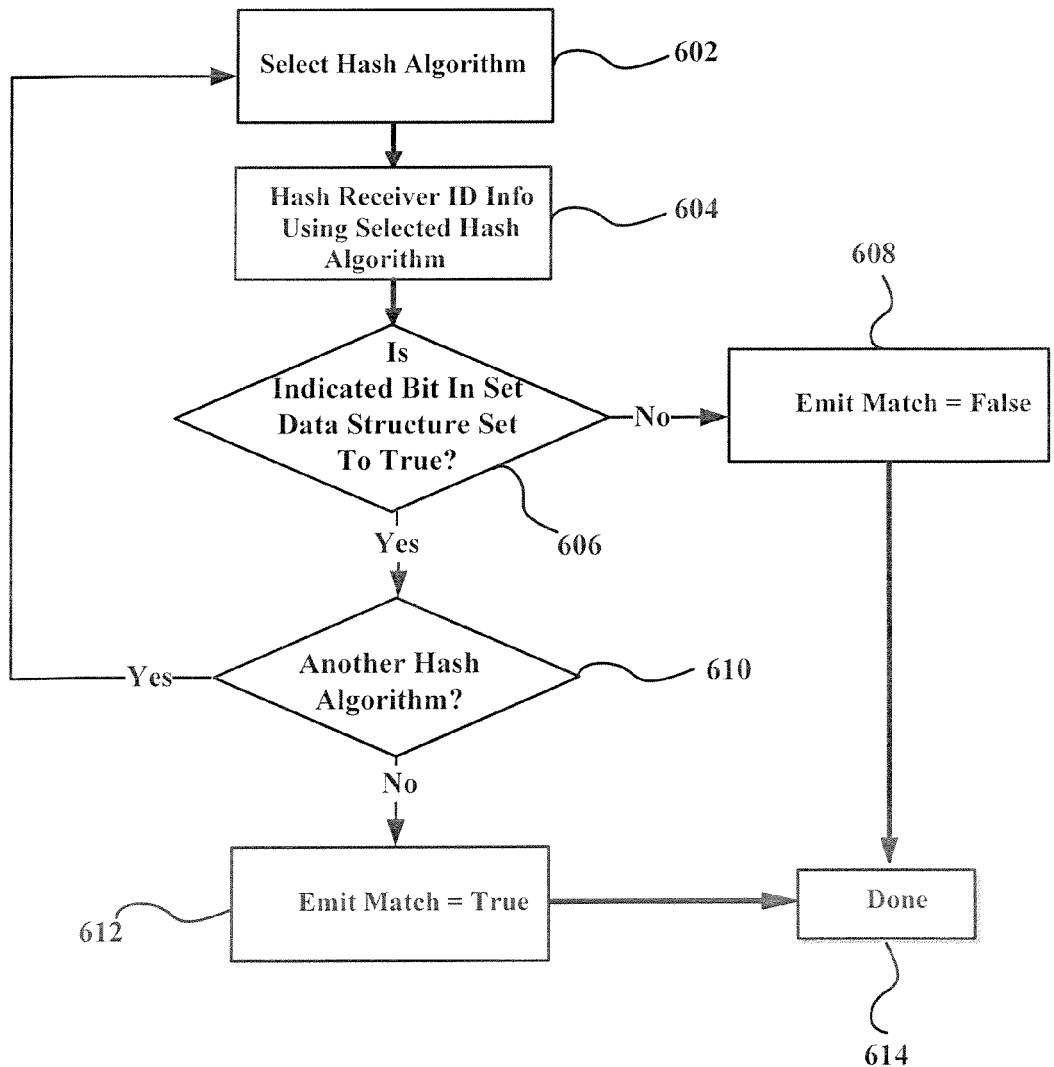
FIG. 6 is a flowchart illustrating identifying a targeted receiver of a broadcast message according to a particular embodiment.

FIG. 6 is a flowchart illustrating identifying a targeted receiver of a broadcast message according to a particular embodiment. As illustrated in FIG. 6, a set data structure may be compared with receiver ID information using a Bloom filter. At block 602, a hash algorithm $h_j$ may be selected (e.g., selected from the same set of predefined hash algorithms used in creating the set data structure (j=1 to k) discussed in reference to FIG. 5 above).

At block 604, the appropriate receiver ID information $x_i$ may be hashed using the selected hashing algorithm $h_j(x_i)$ resulting in the identification of one bit $b_{ij}$ that may constitute the hash value for that element of set data.

At block 606, the bit identified in the previous step $b_{ij}$ is examined in the set data structure. If $b_{ij}$ is set in the set data structure, processing may continue at block 610. If $b_{ij}$ is not set in the set data structure, notice of a negative match (e.g., Match=FALSE) may be emitted at block 608 and the method may terminate at block 614. This may indicate that the current receiver ID information was not included in the original collection of designated receiver ID information (i.e., block 302 of FIG. 3).

If the method continues to block 610, the system may check for another hash algorithm e.g., from the original set of predefined hash algorithms that has not yet been run on the receiver ID information (e.g., j=j+1)). If there are no remaining hash algorithms available, the method may continue at block 612 wherein notice of a positive match (e.g., Membership=TRUE) is emitted. The method may then terminate at block 614. According to some embodiments, this may indicate that all binary hashes for the current receiver ID information were TRUE in the set data structure (i.e., all corresponding bits in the bit vector were set) and thus it is likely (i.e., $P_{err}$ chance that receiver is a false positive) that the current receiver ID information was included in the original collection of designated receiver ID information.

FIG. 7 is a table depicting data set for targeting broadcast messages according to a particular embodiment. The table represents n elements of receiver ID information $x_i$ (x=i to n) being hashed $h_j(x_i)$ to bit positions $b_{ij}$ using k different binary hashing algorithms. The complexity of hashing algorithms may be minimized to run effectively on resource limited receivers. For example, on set-top boxes running an Enhanced TV Binary interchange Format (EBIF) User Agent, hashing algorithms may be defined to provide effective binary hashes while accounting for limited computational capabilities of such agents and underlying hardware.

Figure 8:
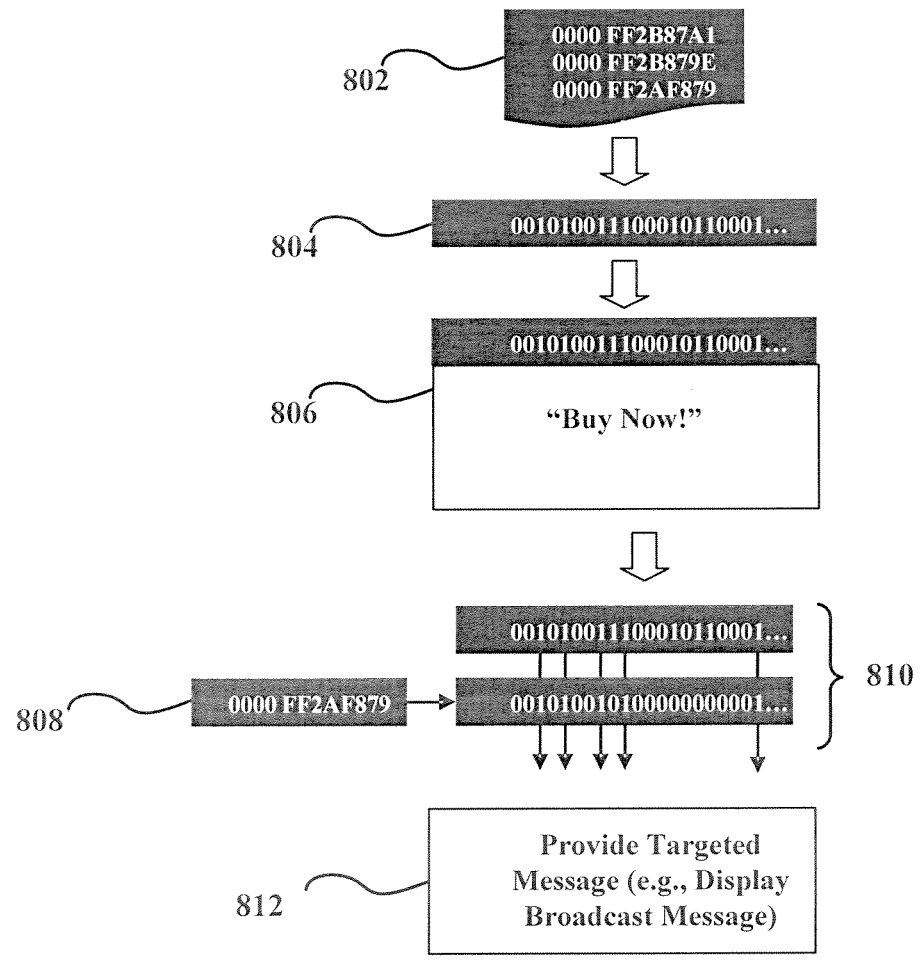
FIG. 8 is a flowchart illustrating transmitting and receiving a targeted broadcast message according to a particular embodiment.

FIG. 8 is a flowchart illustrating transmitting and receiving a targeted broadcast messages according to a particular embodiment. The example in FIG. 8 depicts receiver MAC addresses and a Bloom filter being used to construct a set data structure and assess a targeting match. This set data structure may be one embodiment of a set data structure used in the method illustrated in FIG. 3. At block 802, a collection of MAC addresses may be used as designated receiver ID information. In an addressable advertising application, such addresses may be gathered by linking customer ID information provided by an advertiser with MAC addresses associated with customer set-top boxes provided by a cable television operator.

At block 804, a set data structure may be generated using the collection of MAC addresses. Here the set data structure is depicted as a bit vector generated using a Bloom filter.

Block 806 illustrates the set data structure being embedded with a targeted message (i.e., "Buy Now!") to be targeted to the designated customers represented in the original list. This message might represent, for example, a 30-second interactive or non-interactive video advertisement, or might represent other types or lengths of advertisement or other programming.

The message with its embedded set data structure may then be broadcast to the receivers in the local cable network.

At block 808, the message may be received by a set-top box having the MAC address 0000FF2AF879. That address may be effectively hashed into a bit vector using a Bloom filter and the resulting bit vector compared to the bit vector encoded as the set data structure as depicted in block 810. In this example, all bits set in the bit vector generated from the MAC address are also set in the Bloom filter. Thus a match is indicated, the receiver is declared a member of the set of targeted receivers, and the message (i.e., "Buy Now!") may be presented to the TV viewer associated with that receiver. (Note that address 0000FF2AF879 did appear in the original list of designated receivers, thus is appropriately presented. Also note that the set data structure bit vector includes more 1-bits than the local bit vector. This is due to the set data structure encoding multiple designated receivers (e.g., the receivers with MAC addresses 0000FF2B87A1 and 0000FF2B879E) via the Bloom filter.)

The following example is illustrative of a Bloom filter where designated receiver ID information consists of city names. Other hash functions may be implemented in place of or in addition to the hash function illustrated below.

Consider a collection of designated receivers identified by city names: DAYTON, ST LOUIS, AKRON, and PEORIA ($x_1$ through $x_4$). Assume a bit vector containing 31 entries (bi(s)) is used to encode the set data structure for this ID set. Further assume there are three hash functions that add together the number codes for the letters (where A=1, B=2, ..., Z=26, space=27), square that number $s_i$, and then compute the hash bits using modulus operations (k=3):

$$h_1(x_i)=(s_i\%37)\%31$$

$$h_2(x_i)=(s_i\%41)\%31$$

$$h_3(x_i)=(s_i\%53)\%31$$

The receiver IDs would hash as:
DAYTON ($x_1$): 4+1+25+20+15+14=79, =79*79=6241, 6241%37=25, 6241%41=9, 6241%53=40.

Taking the remainder of each of the last three values modulo 31, yields the bit addresses: $h_1(x_1), h_2(x_1), h_3(x_1)$=25, 9, 9.

ST LOUIS ($x_2$): $s_2$=20164; $h_1(x_2), h_2(x_2), h_3(x_2)$=5, 2, 24
AKRON ($x_3$): $s_3$=3481; $h_1(x_3), h_2(x_3), h_3(x_3)$=3, 6, 5
PEORIA ($x_4$): $s_4$=4096; $h_1(x_4), h_2(x_4), h_3(x_4)$=26, 6, 15

This indicates bits 2, 3, 5, 6, 9, 15, 24, 25, and 26 of the bit vector should be set to 1, resulting in a filter string of:
0110110010000010000000011100000

These 31 bits fit into 4 bytes, while it would require at least 25 bytes to store the four original words as character strings.

At comparison time, the above three hash functions would be run on the city name stored in each receiver. Receivers identified by DAYTON, ST LOUIS, AKRON, and PEORIA would return a positive match to the set data structure given that all hashed hits are set in the bit vector. Thus receivers having these IDs may present the attached message.

Receivers having CHICAGO as their ID would not match the set data structure since the hit hashes for CHICAGO are bits 7, 25, 18 (s=2116). Only bit 25 is set in the bit vector. Thus such receivers may suppress the attached message.

Cities not in the designated receiver ID collection yet having their names hash to bits that are all set in the bit vector may result in false hits. Such false hits may be minimized by appropriate specification of a Bloom filter to account for properties of the potential receiver IDs n and by appropriately specifying the size of the bit vector m and number of hash functions k.

Assuming perfect hash functions (i.e., where each bit hash is randomly distributed to all available bit in the bit vector for all IDs being hashed—not the case using these exemplary hash functions), the false positive rate is given by $P_{err} \approx (1-e^{-kn/m})^k$. In this example, assuming 3 hash functions, 4 elements of receiver set data being encoded, and a 31-bit bit vector, the false positive error rate is given by:

$$P_{err}=(1-e^{-kn/m})^k=(1-e^{-3*4/31})^3=(1-e^{-0.387})^3=(1-0.679)^3=0.033$$

The method for targeting a broadcast message to a subset of receivers in a broadcast network may be implemented in hardware. For example, the algorithms to decode a message or messages may be implemented to utilize an electronic processor. The electronic processor may be associated with a set-top box, or may be associated with other hardware configurations, such as a cellular telephone. The set-top box may be a computer with hardware and software residing in memory and/or other storage mediums, which may also receive and/or transmit audio and/or video. The set-top box may be in communication with another computer or processor over one or more networks. The method may be implemented as software operating on hardware, or may be implemented as hardware. For example, the method may be encoded into firmware.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Certain embodiments are disclosed. Such embodiments include, but are not limited to, a system, and a computer implemented method, for sending a broadcast message to a subset of receivers in a network. The receivers may each contain one or more unique or non-unique ID codes. A set data structure may be created using the unique or non-unique ID codes corresponding to the one or more receivers identified in the subset. A message may be associated with the set data structure. The message and the associated set data structure may be broadcast to the receivers in the network. The receivers may decode the set data structure with one or more of their unique or non-unique ID codes. If the one or more unique or non-unique ID codes encoded in the set data structure match codes associated with the receiver, the associated receiver may process the message. If the one or more unique or non-unique ID codes in the set data structure do not match the one or more unique or non-unique ID codes associated with the receiver, the associated receiver may ignore the message.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

Accordingly, it is to be understood that this disclosure is only illustrative and exemplary and is made to provide an enabling disclosure. Accordingly, the foregoing disclosure is not intended to be construed or to limit the present invention or otherwise to exclude any other such embodiments, adaptations, variations, modifications or equivalent arrangements.

We claim:

1. A method for targeting a broadcast message to a subset of electronic receivers in a broadcast network, comprising:
   collecting identifying information associated with designated electronic receivers of a targeted broadcast message;
   generating, using a computer processor, a data set structure using the identifying information, wherein the data set structure comprises at least a collection of distinct multi-bit hashes generated using a single hash algorithm;
   associating the data set structure with the targeted broadcast message;
   associating a header with the targeted broadcast message, wherein the header identifies a type of identifying information that was used to generate the data set structure; and
   broadcasting the targeted broadcast message and the data set structure to a plurality of electronic receivers, wherein the data set structure provides information allowing each of the plurality of electronic receivers to determine whether the targeted broadcast message is targeted to the electronic receiver.

2. The method of claim 1, wherein the targeted broadcast message comprises a TV advertisement.

3. The method of claim 1, further comprising:
   receiving, by at least one of the plurality of electronic receivers, the targeted broadcast message;
   comparing, using a processor of the at least one of the plurality of electronic receivers, the data set structure against identifying information associated with the at least one of the plurality of electronic receivers; and
   performing an action associated with the electronic receiver in the event that the identifying information associated with the at least one of the plurality of electronic receivers matches identifying information in the data set structure.

4. The method of claim 3, wherein the action comprises presenting the targeted broadcast message on a device associated with the at least one of the plurality of electronic receivers.

5. The method of claim 3, further comprising ignoring, for the at least one of the plurality of electronic receivers, the targeted broadcast message in the event that the identifying information is not associated with the at least one of the plurality of electronic receivers.

6. The method of claim 1, wherein associating the data set structure with the targeted broadcast message comprises embedding the data set structure in the targeted broadcast message.

7. The method of claim 1, wherein the broadcast network comprises at least one of: a terrestrial broadcast TV network, a cable TV network, and a satellite TV network.

8. The method of claim 1, wherein the plurality of electronic receivers comprises at least one of: a set-top box, a device configured to receive broadcast data integrated with a TV, and a mobile device capable of receiving broadcast data.

9. The method of claim 1, wherein identifying information comprises information uniquely identifying a designated electronic receiver including at least one of: a Media Access Control (MAC) address, a street address, a customer identifier, and a network address.

10. The method of claim 1, wherein identifying information comprises information identifying a collection of designated electronic receivers including at least one of: a zip code, a city name, a geo-demographic code, a demographic profile identifier, a segment identifier, and a group identifier.

11. The method of claim 1, wherein the data set structure comprises a Bloom filter.

12. The method of claim 11, wherein the Bloom filter is generated by an operation using a hashing algorithm to generate a hash code of identifying information associated with designated electronic receivers of a targeted broadcast message to a bit address within a fixed-size bit vector, setting a bit corresponding to the bit address to true, and repeating the hashing operation and bit setting using a different hashing algorithm.

13. The method of claim 1, wherein the data set structure further comprises a compressed list of receiver information.

14. A non-transitory computer readable storage medium comprising code to perform the acts of the method of claim 1.

15. A method of receiving a targeted broadcast message by an electronic receiver in a broadcast network, comprising:
   receiving, by the electronic receiver, the targeted broadcast message;
   comparing, using a processor of the electronic receiver, a data set structure associated with the targeted broadcast message against identifying information associated with the electronic receiver, wherein the data set structure comprises at least a collection of distinct multi-bit hashes generated using a single hash algorithm, wherein the targeted broadcast message includes a header identifying a type of identifying information that was used to generate the data set structure; and
   performing an action associated with the electronic receiver in the event that the identifying information associated with the electronic receiver matches identifying information in the data set structure.

16. The method of claim 15, wherein the electronic receiver comprises at least one of: a set-top box, a device, configured to receive broadcast data, integrated with a TV, a mobile device capable of receiving broadcast data.

17. The method of claim 15, wherein identifying information comprises information uniquely identifying a designated electronic receiver including at least one of: a Media Access Control (MAC) address, a street address, a customer identifier, and a network address.

18. The method of claim 15, wherein identifying information comprises information identifying a collection of designated electronic receivers including at least one of: a zip code, a city name, a geo-demographic code, a demographic profile identifier, a segment identifier, and a group identifier.

19. The method of claim 15, wherein the data set structure comprises a Bloom filter.

20. The method of claim 15, wherein the data set structure further comprises a compressed list of receiver information.

21. A system for targeting a broadcast message to a subset of potential electronic receivers in a broadcast network, comprising:
- a network element, wherein the network element is configured to:
- collect identifying information associated with designated electronic receivers of a targeted broadcast message;
- generate a data set structure using the identifying information, wherein the data set structure comprises at least a collection of distinct multi-bit hashes generated using a single hash algorithm;
- associate the data set structure with the targeted broadcast message;
- associating a header with the targeted broadcast message, wherein the header identifies a type of identifying information that was used to generate the data set structure; and
- broadcast the targeted broadcast message and the data set structure to a plurality of electronic receivers, wherein the data set structure provides information allowing at least one of the plurality of electronic receivers to determine whether the targeted broadcast message is targeted to the at least one electronic receiver.

22. The system of claim 21, wherein associating the data set structure with the targeted broadcast message comprises embedding the data set structure in the targeted broadcast message.

23. An electronic device for receiving a targeted broadcast message in a broadcast network, the electronic device comprising one or more processors configured to:
- receive the targeted broadcast message;
- compare a data set structure associated with the targeted broadcast message against identifying information associated with the electronic device, wherein the data set structure comprises at least a collection of distinct multi-bit hashes generated using a single hash algorithm, wherein the targeted broadcast message includes a header identifying a type of identifying information that was used to generate the data set structure; and
- perform an action associated with the electronic device in the event that the identifying information associated with the electronic device matches identifying information in the data set structure.

24. The electronic device of claim 23, wherein the electronic device comprises at least one of: a set-top box, a device configured to receive broadcast data integrated with a TV, and a mobile device capable of receiving broadcast data.

25. The electronic device of claim 23, wherein identifying information comprises information uniquely identifying a designated electronic receiver including at least one of: a Media Access Control (MAC) address, a street address, a customer identifier, and a network address.

26. The electronic device of claim 23, wherein identifying information comprises information identifying a collection of designated electronic receivers including at least one of: a zip code, a city name, a geo-demographic segment code, a demographic profile identifier, a segment identifier, and a group identifier.

27. The electronic device of claim 23, wherein the data set structure comprises a Bloom filter.

28. The electronic device of claim 23, wherein the data set structure further comprises a compressed list of receiver information.

* * * * *